United States Patent [19]
Urano

[11] 3,930,263
[45] Dec. 30, 1975

[54] CAMERA HAVING A SHUTTER MECHANISM CONTROLLED TO REMAIN CLOSED AS A FAILURE WARNING

[75] Inventor: Fumio Urano, Omiya, Japan
[73] Assignee: Asahi Kogaku Kogyo Kabushiki Kaisha, Tokyo, Japan
[22] Filed: Aug. 26, 1974
[21] Appl. No.: 500,669

[30] Foreign Application Priority Data
Aug. 27, 1973 Japan.................................. 48-96012

[52] U.S. Cl................................ 354/268; 354/258
[51] Int. Cl.² ........................................ G03B 17/38
[58] Field of Search ................. 354/268, 241–244, 354/258, 234

[56] References Cited
UNITED STATES PATENTS

| | | |
|---|---|---|
| 3,759,156 | 9/1973 | Kobori.................................. 354/244 |
| 3,821,757 | 6/1974 | Kobori............................. 354/244 X |
| 3,875,580 | 4/1975 | Watanabe et al................... 354/268 |

Primary Examiner—Joseph F. Peters, Jr.
Assistant Examiner—James LaBarre
Attorney, Agent, or Firm—Christie, Parker & Hale

[57] ABSTRACT

A reflex camera shutter mechanism of the type including leading and following shutter screens is prevented from opening so as to warn that an electromagnet in the mechanism is not operating owing to either a failure in the electromagnet itself or a lack of electrical energization thereof. The mirror remains in a picture-taking, non-viewing position when such a failure occurs to serve as a warning to the camera user.

7 Claims, 7 Drawing Figures

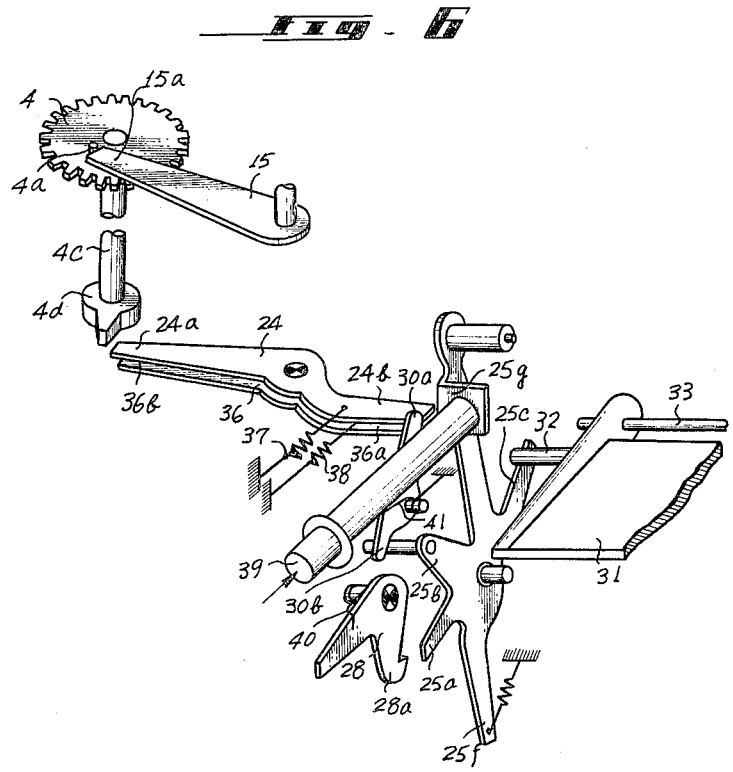
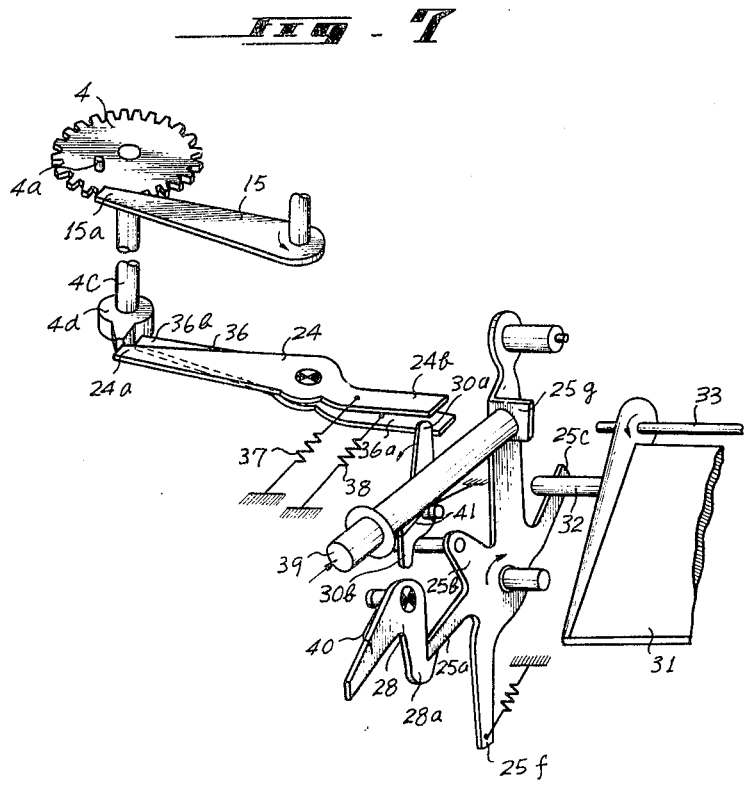

CAMERA HAVING A SHUTTER MECHANISM CONTROLLED TO REMAIN CLOSED AS A FAILURE WARNING

BACKGROUND OF THE INVENTION

This invention relates to cameras. More particularly, it relates to a camera shutter mechanism providing an automatic warning of a failure or error condition.

One of the key controlling elements in a modern focal-plane shutter is an electromagnet. The electromagnet and the armature therefor form part of an arrangement for temporarily holding and then releasing a following shutter curtain or screen so that the following shutter curtain moves in spaced relation to a previously released leading shutter curtain. The separately moving shutter curtains define a moving slit that permits focused light to expose the film.

To operate the electromagnet, electrical current is supplied thereto, typically from a battery built into the camera. Such built-in batteries age and eventually must be replaced because, if the battery is too weak, it will not supply sufficient current to operate the electromagnet. If the camera is used with such a weak battery the resulting photograph will not be properly exposed. Another cause of such improper exposure is the neglect of the photographer who sometimes forgets to insert a new battery after he has removed the old one. Separately, the electromagnet itself is subject to failure.

It is already a common practice to provide a battery checker. This enables the photographer to confirm that he has loaded the battery properly and that the battery is in working condition. These battery checkers, however, are manually operated. This is bothersome and undesirable inasmuch as few photographers want to take the time to check the battery before every picture they take. Furthermore, inasmuch as these battery checkers concern only the battery, they give no information as to the electromagnet itself, which as stated above is an independent source of failure.

SUMMARY OF THE INVENTION

In accordance with this invention, the photographer is given a warning automatically whenever the electromagnet is not operating properly. Thus, regardless of whether the problem is in the electromagnet itself or in the battery for it, the photographer is automatically warned.

The invention is embodied in a camera having a shutter mechanism of the type which includes simultaneously chargeable and separately releasable leading and following shutter screens. The camera has means which when operable is operative upon movement of an actuating member to release the leading shutter screen and thereafter temporarily to hold and then release the following shutter screen. While the released leading shutter screen moves ahead of the following shutter screen there is defined an exposure slit. So as temporarily to hold the following shutter screen, there is included an electromagnet and an armature magnetically attracted thereto when the electromagnet is operated.

According to the invention, there is provided a movable member for supporting the armature. Biasing means are provided to urge the movable member in a direction away from a first position. The movable member is placed in this first position during a first time interval in which the shutter screens are charged. To this end, means which include the actuating member temporarily overcome the urging of the biasing means. The movable member has first and second modes of operation. When the electromagnet is operating, the movable member operates in its first mode and is held in the first position owing to magnetic attraction between the armature and the electromagnet. When not so held during a second time interval immediately following the first time interval, the movable member operates in the second mode wherein it moves to reach a second position before the leading shutter screen is released. Stop means responsive to the movable member operating in the second mode provides for preventing movement of the leading shutter screen.

Preferably, the movable member is a bellcrank having the armature supported on one arm, and the biasing means includes a spring attached to the other arm thereof so as to develop an urging torque.

In a particularly significant preferred feature, the armature-supporting bellcrank is rotatable about a common shaft for a second bellcrank. An interconnecting spring is attached between these two bellcranks. While the shutter screens are charged, the actuating member acts against an arm of the second bellcrank and the interconnecting spring provides sufficient torque to overcome the urging of the biasing means. An advantage of this arrangement is interrelated with the control of a magnet switch closing operation. So as to conserve the camera battery, it is desirable to postpone energization of the electromagnet until a picture-taking operation has commenced. Accordingly, in the preferred embodiment, an arm of the actuating member holds the magnet switch open while the shutter screens are charged. In the course of the picture-taking operation, the arm of the actuating member moves away from the magnet switch which closes in response. The movement of the actuating member also eventually leads to the removal of the positioning torque for the armature-supporting bellcrank. Accordingly, because of the preferred arrangement of the interconnected bellcranks, there is a delay in the response of the armature-supporting bellcrank whereby it will temporarily remain in place incident to the operation of the electromagnet.

To be described herein also are further significant preferred features relating to resetting of the stop means and its complete disabling incident to a mechanical mode of operation of the shutter.

BRIEF DESCRIPTION OF THE DRAWINGS

FIGS. 6 and 7 are perspective views illustrating additional parts that are preferably used in connection with a resetting operation.

DETAILED DESCRIPTION

Figure 1:
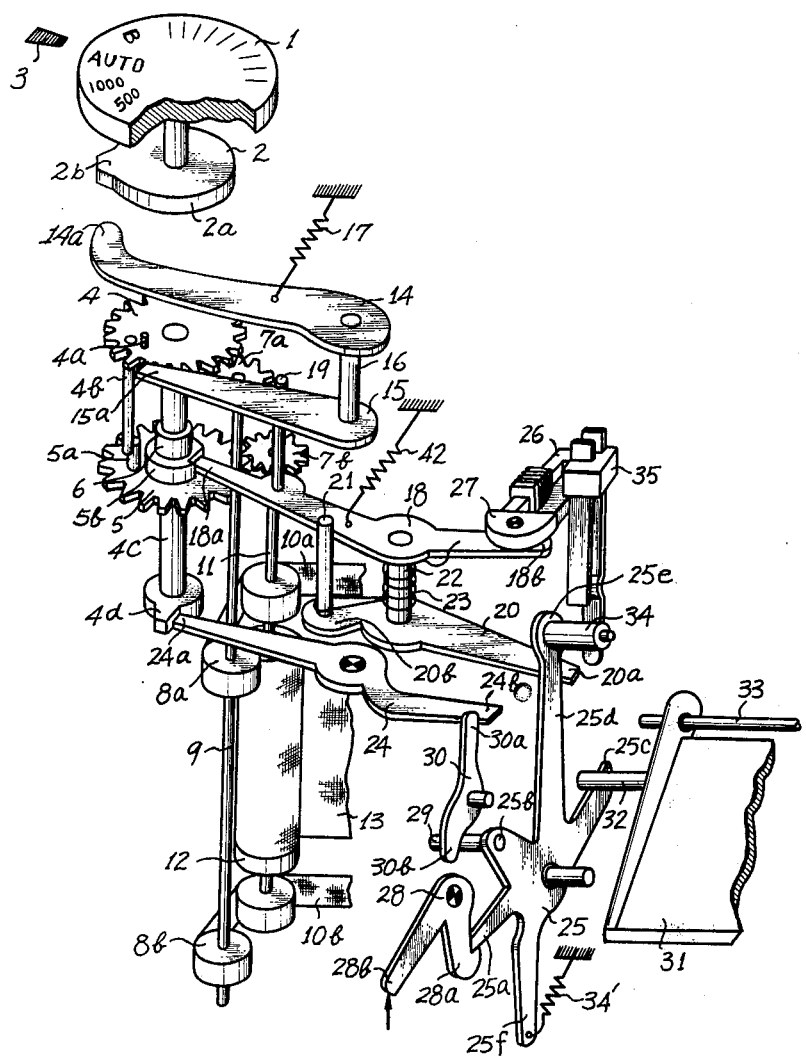
FIG. 1 is a schematic perspective view of a shutter mechanism embodying this invention, with the mechanism being shown at a stage of operation in which the shutter screens are charged and awaiting release.

In FIG. 1 there is shown a shutter speed select dial 1 that is arranged outside of a camera body (not shown). A pointer 3 adjacent the dial 1 is provided to indicate whether the shutter mechanism is in a mechanical mode of operation (as in "B" or Bulb) or is in an electrically controlled mode. As depicted in FIG. 1, the pointer 3 indicates "Auto"; that is, conventional built-in automatic exposure control circuitry (not shown) is connected to electrically control the operation of the shutter. The photographer can also preselect a particular exposure time by rotating the dial to "1000", "600", etc. and the electrical control of the shutter mechanism is directed to achieve the manually selected exposure time in conventional manner.

A cam 2 is connected to rotate with the dial 1. The cam 2 and the remaining members illustrated in FIG. 1 are arranged within the camera body.

The cam 2 is depicted in FIG. 1 in a position wherein the shutter mechanism is electrically controlled. So as to clarify the drawing, some of the conventional elements of the shutter mechanism are not shown. For example, the conventional leading or front shutter screen is not shown. However, the drive mechanism elements for the front screen are shown. Among these are a gear 4 that rotates clockwise (as viewed in FIG. 1) in connection with the winding up of the front screen so as to charge it. When the shutter is permitted to open, the gear 4 rotates counterclockwise.

A pinion 7a is engaged with the gear 4. A depending shaft 9 that is integrally connected to rotate with the pinion 7a carries a pair of vertically spaced-apart shutter ribbon take-up wheels 8a and 8b. A pair of so-called ribbons 10a and 10b wind-up around and unwind from the wheels 10a and 10b in connection with the charging and releasing of the front screen.

A gear 5 is rotatably mounted on a depending shaft 4c that is integrally connected to rotate with the gear 4. A pinion 7b is engaged with the gear 5. A depending shaft 11 is integrally connected to rotate with the gear 5 and defines a roller 12 around which the rear screen 13 winds and unwinds.

To provide for simultaneous charging of the two screens, the gear 4 has a depending pin 4b that, when the gear 4 rotates clockwise to charge the front screen, engages an upright pin 5a fixed to the gear 5 thereby causing the gear 5 to rotate clockwise also and thereby charge the rear screen. Inasmuch as the gear 5 is rotatably mounted to the depending shaft 4c of the gear 4, the two gears are separately rotatable with respect to the counterclockwise direction of rotation.

The depending shaft 4c defines at its lower end a cam 4d. This cam and a front screen arresting lever 24 cooperate to form a stop for holding the shutter closed at least until a conventional camera shutter button (not shown) is operated. The interval of time that occurs between charging and operation of the shutter button is of course arbitrary; a photographer may on occasion wind-up the shutter and then operate the shutter button only seconds later, or he may wait minutes before he decides to take a picture.

In any event, during shutter charging, the driving force from a conventional shutter screen winding gear (not shown) is in conventional manner transmitted to the gear 4. In response, the shutter screens are simultaneously charged as described above. Throughout the ensuing indefinite interval of time ending with the shutter button operation, the cam 4d and the arresting lever 24 prevent the gear 4 from rotating in the counterclockwise direction and accordingly the front screen remains charged. As to the rear screen, it remains charged because, among other things, the depending pin 4b continues to act against the upright pin 5a.

In the space between the cam 2 and the gear 4, there are shown a pair of interconnected levers 14 and 15. The lever 14 occupies the same plane as the cam 2, and the connecting shaft 16 spaces the lever 15 in a somewhat lower plane that is slightly above the plane of the gear 4. A spring 17 biases the interconnected levers 14 and 15 toward clockwise rotation, and causes a curved end 14a of the lever 14 to ride against the circumferential surface of the cam 2.

When the shutter dial 1 is positioned for electrically-controlled operation of the shutter (whether AUTO or manually preselected shutter speed), the protruded portion 2b of the cam 2 acts against the curved end 14a. As to mechanical operation (as with B or bulb), the recessed portion 2a acts thereagainst. In the latter case, the electrical control of the shutter is disabled in conventional manner as by opening a power switch for connecting the battery to electrical control circuitry.

A key element employed in the electrically-controlled operation of the shutter is an electromagnet 26. When operated, the electromagnet attracts an armature 27 that is supported by a movable member 18 that in the preferred embodiment takes the form of a bellcrank.

Biasing means, which includes a spring 42, are provided to urge the movable member 18 in a clockwise direction. The spring 17 similarly urges the movable member 18. This is so because the action of the spring 17 is transmitted through the interconnected levers 14 and 15, and an upright pin 19 which is fixed to one end of the movable member 18 and acted against by the lever 15.

In the preferred embodiment, the movable member 18 performs several functions one of which is related to the conventional function of arresting the rear screen. To this end, the movable member 18 has its end 18a (which is opposite from the end 18b supporting the armature) positioned to act against a stopper 5b that is integrally connected to rotate with the gear 5. When the electromagnet is operated, the magnetic attraction between it and the armature torques the movable member counterclockwise so as to hold in engagement the end 18a and the stopper 5b. This torque also causes the pin 19 to act against the lower level 15 of the interconnected levers 14 and 15. This holds the lever 15 in the position shown in FIGS. 1 and 3 whereby the end 15a of the lever 15 is disposed outside the circular path of a stopper pin 4a that projects upwardly from the gear 4. As will be discussed in more detail below, the stopper pin 4a and the end 15a form part of a stop means that is responsive to the movable member 18 operating in a particular mode of operation.

In the preferred embodiment, the movable member 18 is rotatable about a common shaft 22 for a bellcrank 20. The movable member 18 and the bellcrank 20 are interconnected by a spring 23 that is wound around the shaft 22. The lower end portion of the spring 23 extends radially from the shaft 22 to an upright pin 21 about which it is kinked. The upright pin 21 is supported by one end of the bellcrank 20 which has its other end in the path of movement of one arm 25d of a multi-arm actuating member 25. Each of the arms of the actuating member project radially outwardly from a horizontal axis about which the actuating member is rotatable.

These radially extending arms include an arresting portion 25a, a front screen releasing portion 25b, a mirror actuating portion 25c, the arm 25d whose end 25e supports a horizontally oriented insulating member 34, and an arm 25f. A spring 34' having one end attached to the arm 25f biases the actuating member 25 toward counterclockwise rotation in the perspective of FIG. 1. The actuating member 25, it will be appreciated, can be used also for actuating the lens diaphragm in conventional manner, the actuating portion 25c being suitable for this purpose.

A lever 28 cooperates with the arresting portion 25a to hold the actuating member in the position shown in FIG. 1 while the shutter screens are charged. To this end, the arresting portion 25a is engaged with hooked portion 28a of the lever 28.

Figure 3:
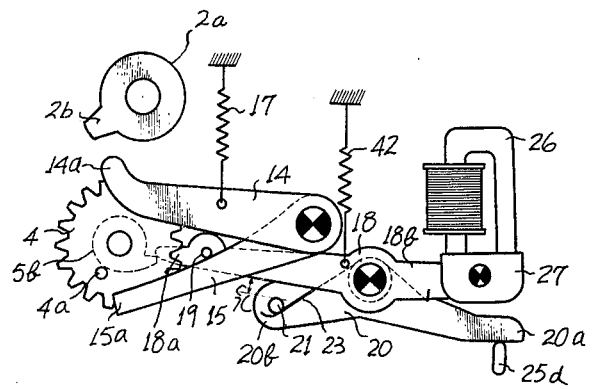
FIG. 3 is a plan view corresponding to the perspective view of FIG. 1.

At the stage of operation depicted in FIG. 1, the hooked end 28a acts against the arresting portion 25a with sufficient force so that the resulting torque on the actuating member is sufficient to overcome the urging of the biasing means which tends to drive the movable member clockwise. This resulting torque is transmitted in part through the engagement of the arm 25d and the arm 20a of the bellcrank 20. This engagement causes the further transmission to the movable member 18 through the resilient action of the spring 23. The spring 23 is designed so that its resilient action when in the condition depicted in FIGS. 1 and 3 is sufficient to overcome the counter urging of the springs 42 and 17.

Consider now the picture-taking operation under the condition where the electromagnet and the electric circuit for it are in working order. As described herein, the picture-taking operation starts after the shutter has been charged. The apparatus relating to charging thereof, such as the shutter charging section and click return section, are conventional. Accordingly, to avoid obscuring the invention, these sections are not shown in detail in the drawings, and their operation is not described herein.

At the start of the picture-taking operation, a force is applied to an end 28b of the lever 28 in the direction indicated by the arrow. This unlatches the hooked end 28b from the arresting portion 25a, and, owing to the tension force of the spring 34', the actuating member 25 rotates counterclockwise. The mirror actuating portion 25c thereby pushes upwardly against a pin 32 which in turn forces the mirror 31 to pivot upwardly, the pivoting axis for the mirror being defined by a shaft 33.

During the initial part of the interval of time in which the mirror is swinging up, the end portion 25c swings through a sufficient arc so that the insulating member 34 attached thereto disengages from a leaf-spring-like portion of a magnet switch 35. In response, the magnet switch closes so as to enable electric current to pass through it to the electromagnet 26. It bears mention that an advantage inheres in postponing the closing of the magnet switch at least until the picture-taking operation commences. That is, the current drawn by an operating electromagnet is fairly substantial when compared to other loads on the battery. If the electromagnet were to be operated throughout the full interval of time that the shutter is charged this would result in a shorter operating life for the battery.

During this initial time interval, the end 20a remains engaged with the arm 25d. As best shown in the plan view of FIG. 3, there is an initial clearance X between the upright pin 21 and the front edge of the movable member 18. Eventually, the end 20a swings through a sufficient arc such that the spring 23 no longer provides its resilient action. With the electromagnet 26 being in operating condition, however, the movable member remains in place.

Also during this initial time interval, the front screen releasing portion 25b pivots through a sufficient arc such that a horizontally oriented pin 29 attached thereto transmits a torque through an intermediate bellcrank 30 to an end 24b of the front screen arresting lever 24. In response, the opposite end 24a of the lever 24 disengages from the recessed portion of the cam 4d. With the release of the stop formed by these two members, the front screen is enabled to move.

As to the rear screen, it begins to follow the front screen after the electromagnet is deenergized. The time delay between the start of movement of the front screen and the deenergization of the electromagnet depends on the result of conventional operations of the electronic circuit section. In conventional practice, such electronic circuit sections include a timing switch, a delay circuit and a current driver stage. The delay circuit responds to the action of the timing switch so as to cause the current driver stage to temporarily provide energization current to the electromagnet. So long as the electromagnet is operating, the magnetic attraction between it and the armature 27 keeps the end 18a of the movable member engaged with the reduced portion of the stopper 5a. By the same token, the upright pin 19 keeps the lever 15 in the position shown so that the stopper pin 4a is free to travel through its circular path. When the electromagnet is eventually deenergized, the urging of the spring 42 is no longer overcome and the movable member accordingly rotates clockwise. This releases the rear screen stop and the rear screen therefore starts to follow the front screen. The fact that the lever 15 will also pivot clockwise has no effect at this stage of operation because the stopper pin 4a has already passed the point at which it would be intercepted by the end 15a. From the foregoing, it will be appreciated that the disclosed arrangement includes means which when operable is operative upon movement of the actuating member 25 to release the front screen and thereafter temporarily hold and then release the rear screen. This of course leads to an exposure slit being defined as the released front screen moves ahead of the following rear screen.

Figure 2:
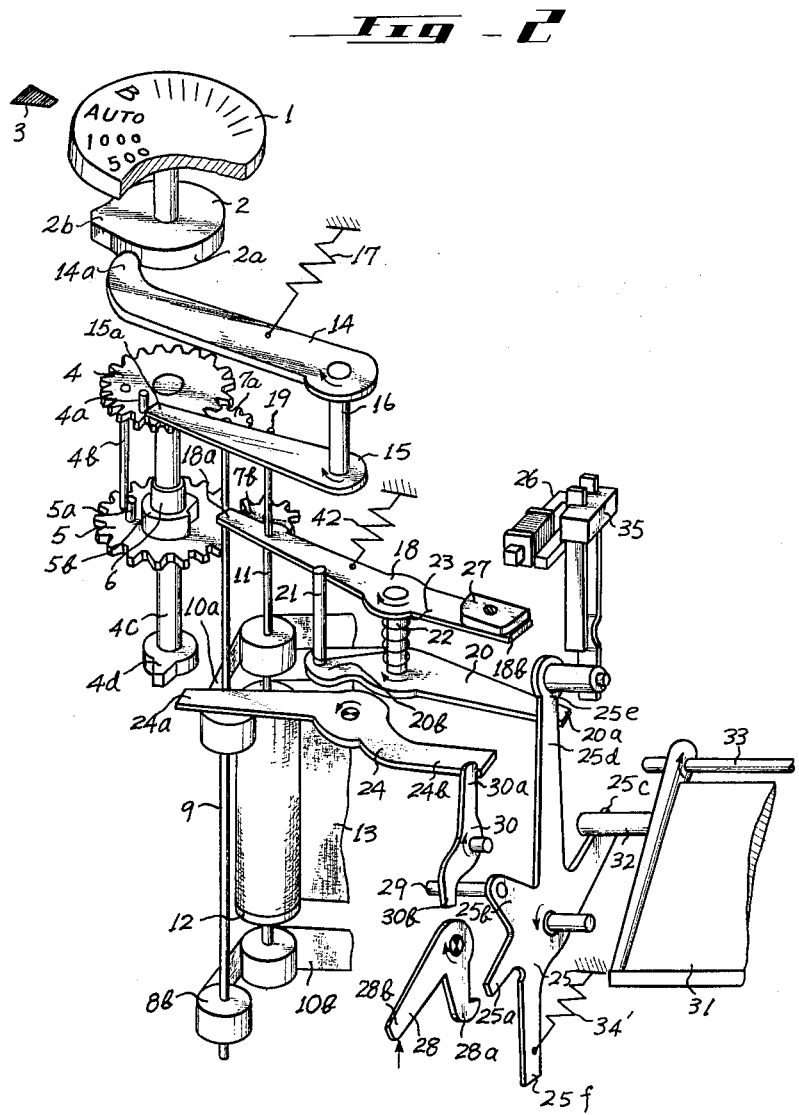
FIG. 2 is a view similar to FIG. 1, but differing therefrom in that there is illustrated a mode of operation by which the shutter is prevented from opening so as to warn that the electromagnet is not operating.
Figure 4:
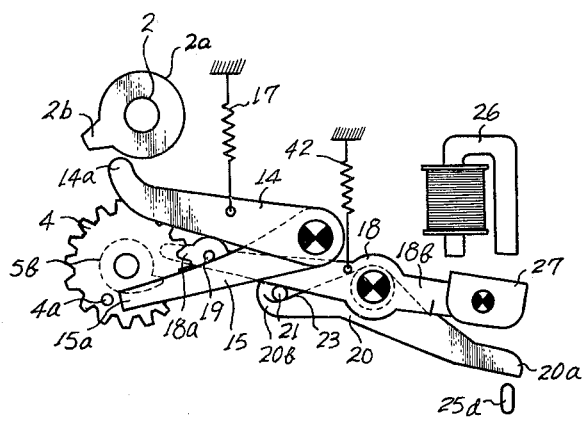
FIG. 4 is a plan view corresponding to the perspective view of FIG. 2.

Consider now the condition in which the foregoing means is not operable either because of a failure in the electromagnet or a lack of energization current therefor. FIGS. 2 and 4 are directed to showing, as to this condition, the relative positions the operating parts assume after the actuating member 25 has moved.

As best shown in FIG. 2, the conventional front screen stopping arrangement of the cam 4d and end 24a is released. Nevertheless, the front screen is stopped from moving. This is so because the stopper pin 4a and the end 15a are engaged. This engagement in turn has occurred because the movable member 18 has operated in a mode of operation in which it moved to the position shown before the conventional stopping arrangement (4d and 24a) released the front curtain. As to the rear screen, it too is stopped from moving because of the engagement between pins 4b and 5a.

Thus the shutter remains closed even though the mirror has swung up. The photographer will immediately realize the existence of a failure condition because the viewfinder (not shown) will be dark, this being so because the mirror will be blocking light from reaching the conventional focusing screen for the viewfinder.

Figure 5:
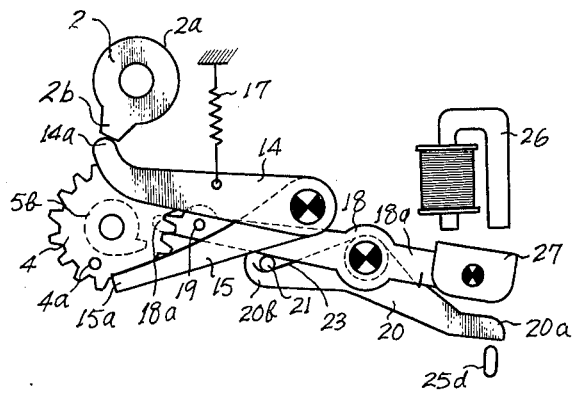
FIG. 5 is a plan view of the same parts shown in FIGS. 3 and 4 in the positions involved in mechanical operation of the shutter.

When the shutter is being controlled mechanically, the electromagnet 26 is not energized and the device of this invention is set inoperative by the cam 2. In other words, when the shutter dial is set to the mechanical control (for example, bulb B), the forward end 14a of the lever 14 is engaged with the protruded portion 2b of cam 2 and therefore the forward end 15a of lever 15, in spite of the movement of lever 18 as described previously, will not move to the position at which it arrests the pin 4a. This state is shown in FIG. 5.

It will be appreciated that, if the electromagnet 26 is not energized at a proper moment, then the mirror will be held in the swung-up position and the front and rear screens will be kept inoperative. To reset the shutter mechanism the shutter dial 1 may be set to the mechanical control. With this resetting operation each member moves from the positions shown in FIG. 4 to the position shown in FIG. 5 and the front and rear screens are permitted to run when they are released by the lever 15. At that time the exposure time is determined depending on the setting of mechanical control. If the mechanical control could be effected only at bulb B, it would be inconvenient because the shutter is controlled at the bulb position B and one film frame is exposed uselessly. Preferably, this disadvantage is eliminated by use of the following arrangement with which the shutter mechanism can be reset to the original position.

FIG. 6 illustrates the mechanism in the position where, as a result of a lack of operation of the magnet 26, the mirror 31 is in a swung-up position and the front screen is kept arrested by the lever 15. In connection with the preferred arrangement for resetting, the mirror actuating lever 25 is provided with a portion 25g which is associated with an externally operable member 39 as shown in the drawing. A lever 36 having the same function as the front screen arresting lever 24 is provided. These levers 24 and 36 are urged by springs 37 and 38, respectively. Springs 40 and 41 are restoring springs for the levers 28 and 30, respectively. These springs 40 and 41 are omitted from FIGS. 1 and 2.

In FIG. 6 when the operating member 39 is displaced in the direction of arrow, the portion 25g is pushed and then the mirror actuating lever 25 is arrested by one end 28a of lever 28. This is because the lever 28 is urged counterclockwise by the action of spring 40. Thus the mechanism is brought into the state of FIG. 7 and the intermediate lever 30 is restored by the action of spring 41 to the original position. The front screen driving gear 4 is arrested by the lever 15 at a position slightly displaced from the position where it has been arrested by the arresting lever 24. Accordingly, the forward end 24b of lever 24 is pushed away by the protruded portion 4d and the front screen cannot be arrested. To arrest the front screen by the forward end 36b of lever 36, said forward end 36b may be made shorter than the forward end 24b of lever 24 by a suitable length (see FIG. 7). Then the lever 15 releases the portion 4a by way of spring 23, lever 20, lever 18 and pin 19 shown in FIGS. 1 and 2. As mentioned previously the mechanism of this invention is set in such a manner that the arresting member 4d is released by the lever 24 after the pin 4a has been released by the lever 15. In a reversed operation, therefore, the release operation of pin 4a by the lever 15 is effected after the stopper 4d has been released by the lever 36.

The mechanism of FIG. 7 is very similar to that of FIG. 1 but shown in the position where the front screen is arrested by the lever 36. In this state when the battery is exchanged and the shutter is released with the shutter dial set to the mechanical control, then a normal shutter operation will be effected and the waste of film will be eliminated.

With the device of this invention it is possible to check at each photographing operation whether the electronic control has been operated normally or not and this checking operation can be effected automatically immediately after each shutter releasing operation without resorting to any external operation (for example, operation of a power switch, etc.). The device of this invention can be applied easily to cameras equipped with not only a shutter of electronic control type but also a shutter of mechanical control type.

In addition, the invention in its preferred arrangement has the advantage that even when the electronic control performs an error operation and the check mechanism operates, the shutter can be reset easily by an external operation and also the shutter does not start operating with such an error operation, thereby preventing the film from being wasted.

What is claimed is:

1. In a single lens reflex camera having an actuating member, a mirror for reflecting light passing through the single lens to enable composition and focusing when the mirror is in a picture-composing position, the mirror being pivoted for rotation from its picture-composing position to a picture-taking position whereat it does not reflect the light, a shutter mechanism of the type which includes simultaneously chargeable and separately releasable leading and following shutter screens, and electromechanical means which when operable is operative upon movement of the actuating member to release the leading shutter screen and thereafter temporarily to hold and then release the following shutter screen so as to define an exposure slit as the released leading shutter screen moves ahead of the following shutter screen, said electromechanical means including an electromagnet and an armature magnetically attracted thereto when the electromagnet is operated in connection with the operation of holding the following shutter screen, the improvement for providing a warning that said electromechanical means is not operable, which comprises:

means for moving the mirror from its picture-composing position to its picture-taking position so that until said electromechanical means has completed its operation light passing through the single lens is not blocked from passing through the exposure slit;
a movable member for supporting the armature;
biasing means for urging the movable member in a direction away from a first position;
means, including said actuating member, for temporarily overcoming the urging of the biasing means so as to place the movable member in the first position during a first time interval in which the shutter screens are charged;
the movable member having a first mode of operation when the electromagnet is operating, in which first mode the movable member is held in the first position owing to magnetic attraction between the armature and the electromagnet, and having a second mode of operation if not so held during a second time interval immediately following the first time interval, in which second mode the movable member moves to reach a second position before the leading shutter screen is released; and stop means responsive to the movable member operating in the second mode for preventing movement of the leading shutter screen while the mirror remains in its picture-composing position.

2. The improvement of claim 1 wherein the movable member is a bellcrank having the armature supported on one end thereof adjacent to the electromagnet.

3. The improvement of claim 2 wherein said means that includes the actuating member further comprises a bellcrank which has an arm against which the actuating member acts to develop a torque while the shutter is charged, and which is oriented in parallel with the armature-supporting bellcrank, and a spring interconnecting the two bellcranks, the spring resiliently overcoming the opposed action of the biasing means incident to the torque developed by the actuating member.

4. The improvement of claim 3 wherein a magnet switch is connected to the electromagnet and is operated in response to movement of the actuating member during an interval of time in which said interconnecting spring temporarily continues to resiliently overcome the opposed action of the biasing means.

5. The improvement of claim 1 further comprising means for selecting a mechanical mode of operation for the shutter, and means responsive to such mechanical selection for disabling said stop means.

6. The improvement of claim 1 further comprising an externally operable member arranged in association with the actuating member for resetting the stop means.

7. The improvement of claim 1 wherein the shutter mechanism includes a gear that rotates in association with movement of the leading shutter screen, and wherein said stop means includes a stop pin supported by said gear so that the stop pin is movable in a circular path, a lever having a stop end which is positionable into said circular path so as to intercept the stop pin, a pin fixed to the movable member for acting against the lever while the movable member is in the first position, and means operable when the movable member operates in its second mode of operation for urging the lever into its intercepting position.

* * * * *